(12) United States Patent
Vieira Rocha et al.

(10) Patent No.: US 11,587,362 B2
(45) Date of Patent: Feb. 21, 2023

(54) TECHNIQUES FOR DETERMINING SIGN LANGUAGE GESTURE PARTIALLY SHOWN IN IMAGE(S)

(71) Applicant: Lenovo (Singapore) Pte. Ltd., Singapore (SG)

(72) Inventors: Jampierre Vieira Rocha, Indaiatuba (BR); Jeniffer Lensk, Votorantim (BR); Marcelo da Costa Ferreira, Campinas (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 17/124,420

(22) Filed: Dec. 16, 2020

(65) Prior Publication Data

US 2022/0188538 A1 Jun. 16, 2022

(51) Int. Cl.
*G06V 40/20* (2022.01)
*G06N 3/02* (2006.01)
(Continued)

(52) U.S. Cl.
CPC ............. *G06V 40/28* (2022.01); *G06F 3/017* (2013.01); *G06F 40/10* (2020.01); *G06F 40/56* (2020.01); *G06N 3/02* (2013.01); *G06V 40/107* (2022.01)

(58) Field of Classification Search
CPC ...... G06V 40/28; G06V 40/107; G06V 10/74; G06V 10/82; G06F 3/017; G06F 40/10; G06N 3/02
See application file for complete search history.

(56) References Cited

U.S. PATENT DOCUMENTS 1,646,249 A 10/1927 Hoxie
4,025,780 A 5/1977 Krase et al.
(Continued)

FOREIGN PATENT DOCUMENTS

EP 1486818 A3 3/2005
JP 060331805 12/1994
(Continued)

OTHER PUBLICATIONS

"Backpropagation", Wikipedia, retrieved on Oct. 21, 2020 from https://en.wikipedia.org/wiki/Backpropagation.
(Continued)

*Primary Examiner* — Amy M Levy
(74) *Attorney, Agent, or Firm* — John M. Rogitz; John L. Rogitz (57) ABSTRACT

In one aspect, a device may include a processor and storage accessible to the processor. The storage may include instructions executable by the processor to receive at least one image that indicates a first gesture being made by a person using a hand-based sign language, with at least part of the first gesture extending out of the image frame of the image. The instructions may then be executable to provide the image to a gesture classifier and to receive plural candidate first text words for the first gesture from the gesture classifier. The instructions may then be executable to use at least a second text word correlated to a second gesture to select one of the candidate first text words, combine the second text word with the selected first text word to establish a text string, and provide the text string to an apparatus different from the device.

20 Claims, 6 Drawing Sheets

(51) Int. Cl.
*G06F 40/10* (2020.01)
*G06F 40/56* (2020.01)
*G06F 3/01* (2006.01)
*G06V 40/10* (2022.01)

(56) References Cited

U.S. PATENT DOCUMENTS

| | | | |
|---|---|---|---|
| 4,143,394 A | 3/1979 | Schoberl | |
| 4,309,075 A | 1/1982 | Apfel et al. | |
| 4,703,405 A | 10/1987 | Lewin | |
| 4,876,680 A | 10/1989 | Misawa et al. | |
| 4,984,144 A | 1/1991 | Cobb et al. | |
| 5,124,961 A | 6/1992 | Yamaguchi et al. | |
| 5,208,800 A | 5/1993 | Isobe et al. | |
| 5,659,764 A * | 8/1997 | Sakiyama | G09B 21/009 |
| | | | 345/473 |
| 5,667,700 A | 9/1997 | Rudigier et al. | |
| 5,715,226 A | 2/1998 | Shimano et al. | |
| 5,767,020 A | 6/1998 | Sakaguchi et al. | |
| 6,129,866 A | 10/2000 | Hamanaka et al. | |
| 6,304,527 B1 | 10/2001 | Ito et al. | |
| 6,307,827 B1 | 10/2001 | Nishiwaki | |
| 6,354,709 B1 | 3/2002 | Campbell et al. | |
| 6,361,190 B1 | 3/2002 | McDermott | |
| 6,377,925 B1 * | 4/2002 | Greene, Jr. | G10L 21/06 |
| | | | 704/235 |
| 6,439,731 B1 | 8/2002 | Johnson et al. | |
| 6,607,286 B2 | 8/2003 | West et al. | |
| 6,666,569 B2 | 12/2003 | Obata | |
| 6,674,096 B2 | 1/2004 | Sommers | |
| 6,679,621 B2 | 1/2004 | West et al. | |
| 6,724,543 B1 | 4/2004 | Chinniah et al. | |
| 7,004,610 B2 | 2/2006 | Yamashita et al. | |
| 7,083,313 B2 | 8/2006 | Smith | |
| 7,142,769 B2 | 11/2006 | Hsieh et al. | |
| 7,153,002 B2 | 12/2006 | Kim et al. | |
| 7,254,309 B1 | 8/2007 | Chou et al. | |
| 7,319,244 B2 | 1/2008 | Liu et al. | |
| 8,566,075 B1 * | 10/2013 | Bruner | H04N 21/6582 |
| | | | 704/2 |
| 10,089,901 B2 * | 10/2018 | Jung | G09B 21/009 |
| 10,176,366 B1 * | 1/2019 | Maxwell | H04N 21/42203 |
| 10,304,208 B1 * | 5/2019 | Chandler | G06F 3/017 |
| 11,320,914 B1 * | 5/2022 | Ni | G06F 3/017 |
| 2001/0030938 A1 | 10/2001 | Oumi et al. | |
| 2002/0001283 A1 | 1/2002 | Niwa et al. | |
| 2002/0111794 A1 * | 8/2002 | Yamamoto | G10L 17/26 |
| | | | 704/E15.041 |
| 2004/0130882 A1 | 7/2004 | Hara et al. | |
| 2005/0185391 A1 | 8/2005 | Lee et al. | |
| 2006/0067078 A1 | 3/2006 | Beeson et al. | |
| 2006/0076568 A1 | 4/2006 | Keller et al. | |
| 2006/0081863 A1 | 4/2006 | Kim et al. | |
| 2006/0104080 A1 | 5/2006 | Kim et al. | |
| 2006/0208267 A1 | 9/2006 | Chin et al. | |
| 2006/0273337 A1 | 12/2006 | Han et al. | |
| 2007/0291910 A1 * | 12/2007 | Bucchieri | G09B 21/009 |
| | | | 379/88.06 |
| 2010/0299150 A1 * | 11/2010 | Fein | G06F 40/58 |
| | | | 704/277 |
| 2011/0301934 A1 * | 12/2011 | Tardif | G06F 40/44 |
| | | | 382/103 |
| 2013/0152092 A1 * | 6/2013 | Yadgar | G10L 15/1822 |
| | | | 718/102 |
| 2013/0304451 A1 * | 11/2013 | Sarikaya | G06F 40/58 |
| | | | 704/2 |
| 2017/0277684 A1 * | 9/2017 | Dharmarajan Mary | |
| | | | G10L 13/00 |
| 2019/0138607 A1 * | 5/2019 | Zhang | G06N 3/0454 |
| 2019/0171716 A1 * | 6/2019 | Weber | H04N 7/15 |
| 2019/0251344 A1 * | 8/2019 | Menefee | G06V 40/165 |
| 2019/0340426 A1 * | 11/2019 | Rangarajan | G06F 3/017 |
| 2019/0392587 A1 * | 12/2019 | Nowozin | G06T 7/75 |
| 2020/0005673 A1 * | 1/2020 | Lin | G09B 21/009 |
| 2020/0167556 A1 * | 5/2020 | Kaur | G06V 10/28 |
| 2021/0019982 A1 * | 1/2021 | Todd | H04N 21/4438 |
| 2021/0397266 A1 * | 12/2021 | Gupta | G06F 1/163 |

FOREIGN PATENT DOCUMENTS

| | | |
|---|---|---|
| JP | 9198830 | 7/1997 |
| JP | 11045455 | 2/1999 |
| JP | 11083798 | 3/1999 |
| JP | 11271339 | 10/1999 |
| WO | 0028536 A1 | 5/2000 |

OTHER PUBLICATIONS

"Batch normalization", Wikipedia, retrieved on Oct. 21, 2020 from https://en.wikipedia.org/wiki/Batch_normalization.

"Brazilian Sign Language", Wikipedia, retrieved on Oct. 21, 2020 from https://en.wikipedia.org/wiki/Brazilian_Sign_Language#:~:text=Brazilian%20Sign%20Language%20(BSL)%20is,(Brazilian%20Cities%20Sign%20Language).

"Meet the Hand Talk Sign Language Translator App". Hugo's Blog, retrieved on Oct. 21, 2020 from https://handtalk.me/en/BlogPost/Index/?Id=4.

"Natural-language understanding", Wikipedia, retrieved on Oct. 21, 2020 from https://en.wikipedia.org/wiki/Natural-language_understanding.

"Pounds interpreter on mobile: learn how to use the Hand Talk app", TechTudo, Machine Translation, retrieved on Oct. 21, 2020 from https://www.techtudo.com.br/dicas-e-tutoriais/2019/05/interprete-de-libras-no-celular-saiba-como-usar-o-app-hand-talk.ghtml.

Binghe Ma, C. Morsbach and H. H. Gatzen, "A novel flying height measurement approach for optical sliders," Asian Conference on Sensors, 2003. AsiaSense 2003., 2003, pp. 29-32, doi: 10.1109/ASENSE.2003.1224988.

File History of U.S. Appl. No. 11/175,746.

Partial file history of U.S. Appl. No. 09/585,428.

* cited by examiner

TECHNIQUES FOR DETERMINING SIGN LANGUAGE GESTURE PARTIALLY SHOWN IN IMAGE(S)

FIELD

The present application relates to technically inventive, non-routine solutions that are necessarily rooted in computer technology and that produce concrete technical improvements.

BACKGROUND

Electronic video conferencing is becoming increasing prevalent in today's society. But as recognized herein, one person might not be able to audibly communicate but may be able to perform gestures according to a sign language to participate in the video conference. However, other conferees might not be able to understand what the person is gesturing and, as further recognized herein, even if software were used to help identify the various gestures that were being performed, the software might not work for gestures performed off to the side and not fully within the field of view of the camera (e.g., if the person were too close to the camera for all gestures to be fully captured). Thus, as recognized herein, if the person inadvertently signs a gesture partially outside of the field of view of the camera, the remote conferees may not be apprised of what was being signed. There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive one or more images from a camera, with the one or more images indicating a first gesture being made by a person using a hand-based sign language. At least part of the first gesture extends out of at least one respective image frame of the one or more images. The instructions are also executable to provide the one or more images to a sign language gesture classifier established at least in part by an artificial neural network and to receive, from the sign language gesture classifier, plural candidate first text words for the first gesture. The instructions are then executable to use at least a second text word correlated to a second gesture different from the first gesture to select one of the candidate first text words for the first gesture, combine the second text word with the selected first text word for the first gesture to establish a text string, and provide the text string to an apparatus different from the first device.

In some example implementations, at least part of the first gesture may extend out of each respective image frame of the one or more images.

Also in some example implementations, natural language understanding may be executed to select the selected first text word from the candidate first text words using the second text word. Additionally, the sign language gesture classifier may be configured for receiving as input images of respective gestures and providing as output one or more respective text words corresponding to respective gestures from the input. If desired, the sign language gesture classifier may even use a database of image frames corresponding to respective gestures to provide the output.

Additionally, in some example embodiments the instructions may be executable to use at least the second text word and a third text word correlated to a third gesture different from the first and second gestures to select one of the candidate first text words for the first gesture. The second gesture as indicated in images from the camera may have been gestured before the first gesture and the third gesture as indicated in images from the camera may have been gestured after the first gesture. The instructions may then be executable to combine the second and third text words with the selected first text word for the first gesture to establish the text string, where the text string may include the second text word placed before the first text word and the third text word placed after the first text word.

In some example implementations, the apparatus may be a display controlled by the first device, the text string may be presented on the display, and the first device may receive the one or more images from a third device different from the first device and apparatus. In other example implementations, the first device may be a server, the apparatus may be an end-user device, and the one or more images may be received from a third device different from the first device and apparatus. In still other example implementations, the first device may include the camera, the first device may be a first end-user device, and the apparatus may be a second end-user device.

In another aspect, a method includes providing, at a first device, at least one image showing a first gesture into a gesture classifier to receive, as output from the gesture classifier, a first text word corresponding to the first gesture. The method also includes providing, at the first device, at least one image partially but not fully showing a second gesture into the gesture classifier to receive, as output from the gesture classifier, a second text word corresponding to the second gesture. The second gesture is different from the first gesture and the second text word is different from the first text word. The method then includes providing, to an apparatus different from the first device, a text string indicating the first text word and the second text word.

Thus, in some example embodiments the gesture classifier may determine plural candidate second text words for the second gesture as the output, and the first device may use the first text word to select one of the candidate second text words to use in the text string. If desired, the first device may execute natural language understanding to use the first text word to select one of the candidate second text words based on context determined from the first text word.

Also in some example embodiments, the gesture classifier may extrapolate additional portions of the second gesture extending out of the at least one image partially but not fully showing the second gesture. The gesture classifier may thus use the extrapolation to output plural candidate second text words.

Still further, in some example implementations the first gesture may be correlated to the first text word according to a sign language corresponding to a first written language, and the second gesture may be correlated to the second text word according to the sign language. So, for example, the text string provided to the apparatus may include a third text word in a second written language that corresponds to the first text word in the first written language, where the second written language may be different from the first written language, and the text string provided to the apparatus may also include a fourth text word in the second written language that corresponds to the second text word in the first written language.

Also note that in some example implementations the first device may include a server and the apparatus may include a second device of an end-user.

In still another aspect, at least one computer readable storage medium (CRSM) that is not a transitory signal includes instructions executable by at least one processor to receive one or more images at a first device. The one or more images indicate a first gesture being made by a person using a sign language, with at least part of the first gesture extending out of at least one respective image frame of the one or more images. The instructions are also executable to provide the one or more images to a gesture classifier and to receive, from the gesture classifier, plural candidate first text words for the first gesture. The instructions are then executable to use context determined from at least a second text word that has been correlated to a second gesture different from the first gesture to select one of the candidate first text words for the first gesture. Thereafter the instructions are executable to combine the second text word with the selected first text word to establish a text string and to provide the text string to an apparatus.

In some example implementations, the gesture classifier may be established at least in part by a trained artificial neural network (ANN), where the ANN may be trained prior to the gesture classifier outputting the plural candidate first text words. The ANN may be trained using labeled sample image frames indicating various gestures in the sign language, for example.

Additionally, if desired natural language understanding may be executed to determine the context from the second text word.

Also if desired, the instructions may be executable to execute the gesture classifier to output the candidate first text words, where the gesture classifier may use a database of image frames indicating various gestures to identify the candidate first text words.

The details of present principles, both as to their structure and operation, can best be understood in reference to the accompanying drawings, in which like reference numerals refer to like parts, and in which:

DETAILED DESCRIPTION

Among other things, the present disclosure discusses use of an end-to-end software application or set of applications that translates sign language gestured by a first person into text for presentation to a second person even if part of a gesture from the first person was not captured or detected by the camera and hence may be ambiguous to the application. This might occur, for example, where part of the gesture was performed outside of the field of view of the camera. To this end, video partially showing the ambiguous gesture may be broken up into individual image frames and those frames may then be compared to other image frames in a known database to identify plural candidate text words that might correspond to the partially-shown gesture.

In some examples, more than one of the frames from the video may be used for the comparison for greater accuracy, if desired, since the frames might show different parts of the gesture as progressively made over time. Image frames showing hand transitions from one gesture to another may also be used.

Then responsive to plural candidate text words being identified as possibly corresponding to the single sign language gesture not fully captured according to the camera's field of view, natural language understanding or other context-awareness software (e.g., other digital assistant software) may be executed to select one of the plural candidate text words as the intended word based on the context of other words gestured before and/or after the ambiguous gesture. Additionally, note that in instances where an entire sign language gesture is "lost" completely in that none of the gesture is captured by the camera, the natural language understanding or other software may also be used to select a given word from among a larger set of words based on the context of the surrounding gestures. The larger set of words (e.g., beyond a set of the candidate text words that might not be available at all owing to all of the gesture being fully performed off-camera) might include all dictionary words for a given written language corresponding to the sign language being used, for example.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
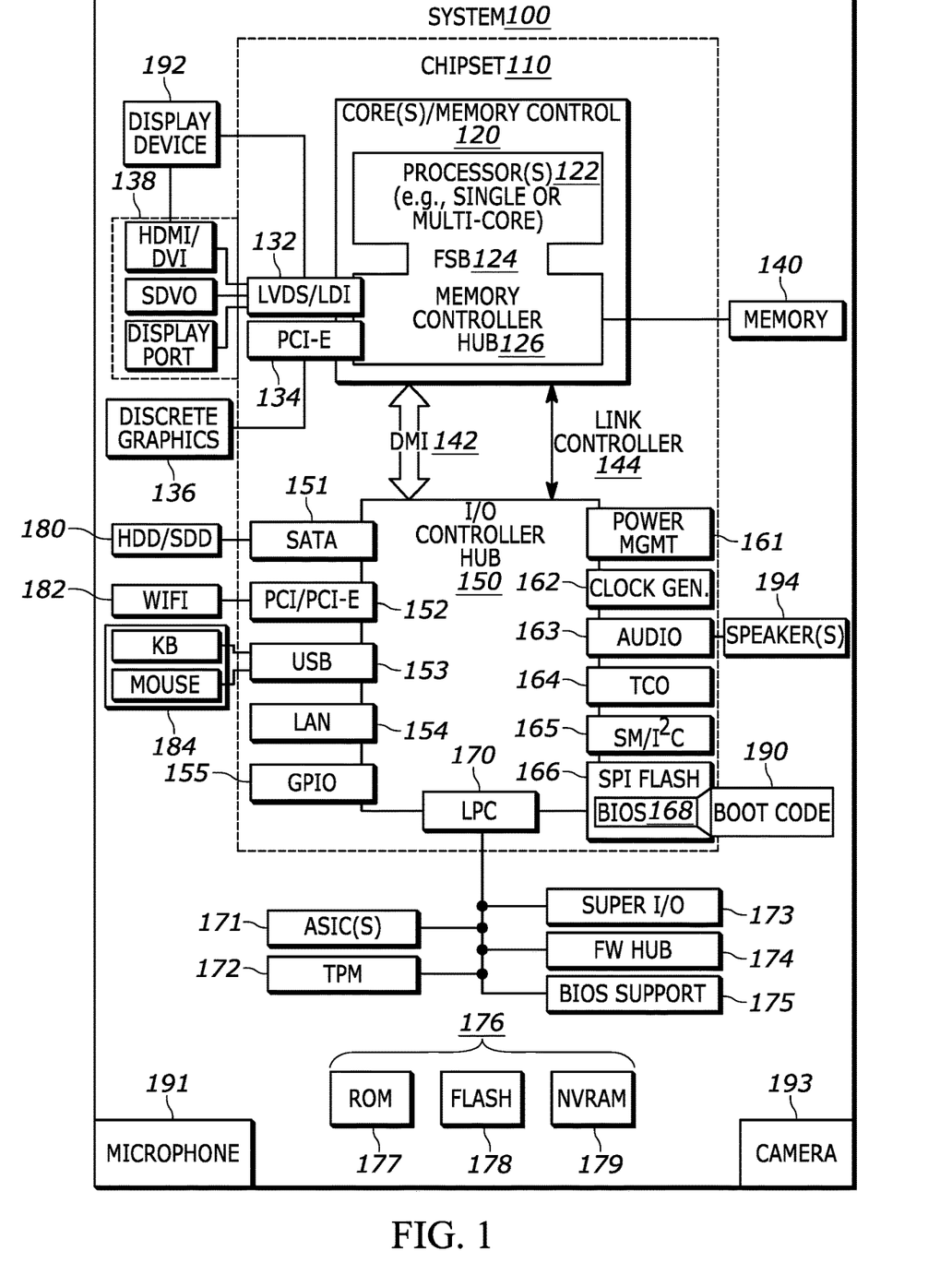
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone 191 to the processor 122 based on audio that is detected, such as via a user providing audible input to the microphone 191 as part of a video conference consistent with present principles. The system 100 may also include one or more cameras 193 that gather one or more images and provide the images and related input to the processor 122, such as for facilitating video conferencing consistent with present principles. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
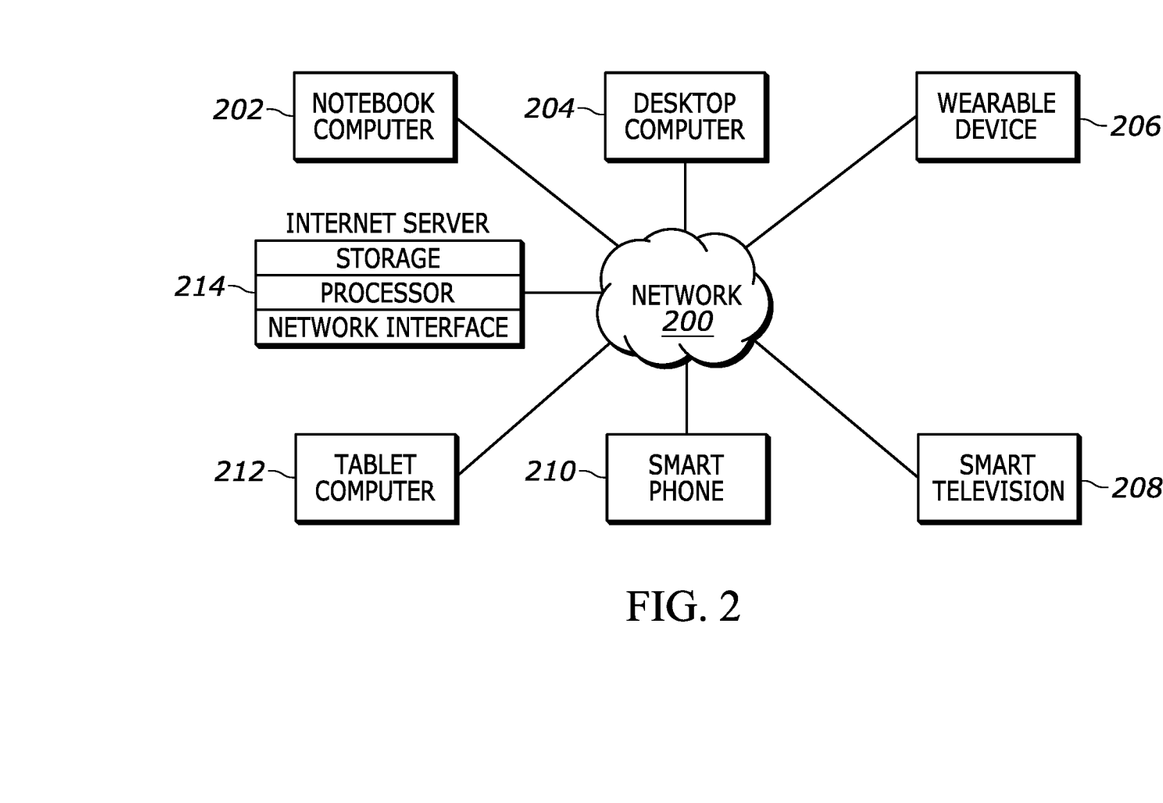
FIG. 2 is a block diagram of an example network of devices consistent with present principles.

Turning now to FIG. 2, example devices are shown communicating over a network 200 such as the Internet in accordance with present principles, such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles, such as facilitating video conferencing or otherwise streaming video of a person performing sign language.

Figure 3:
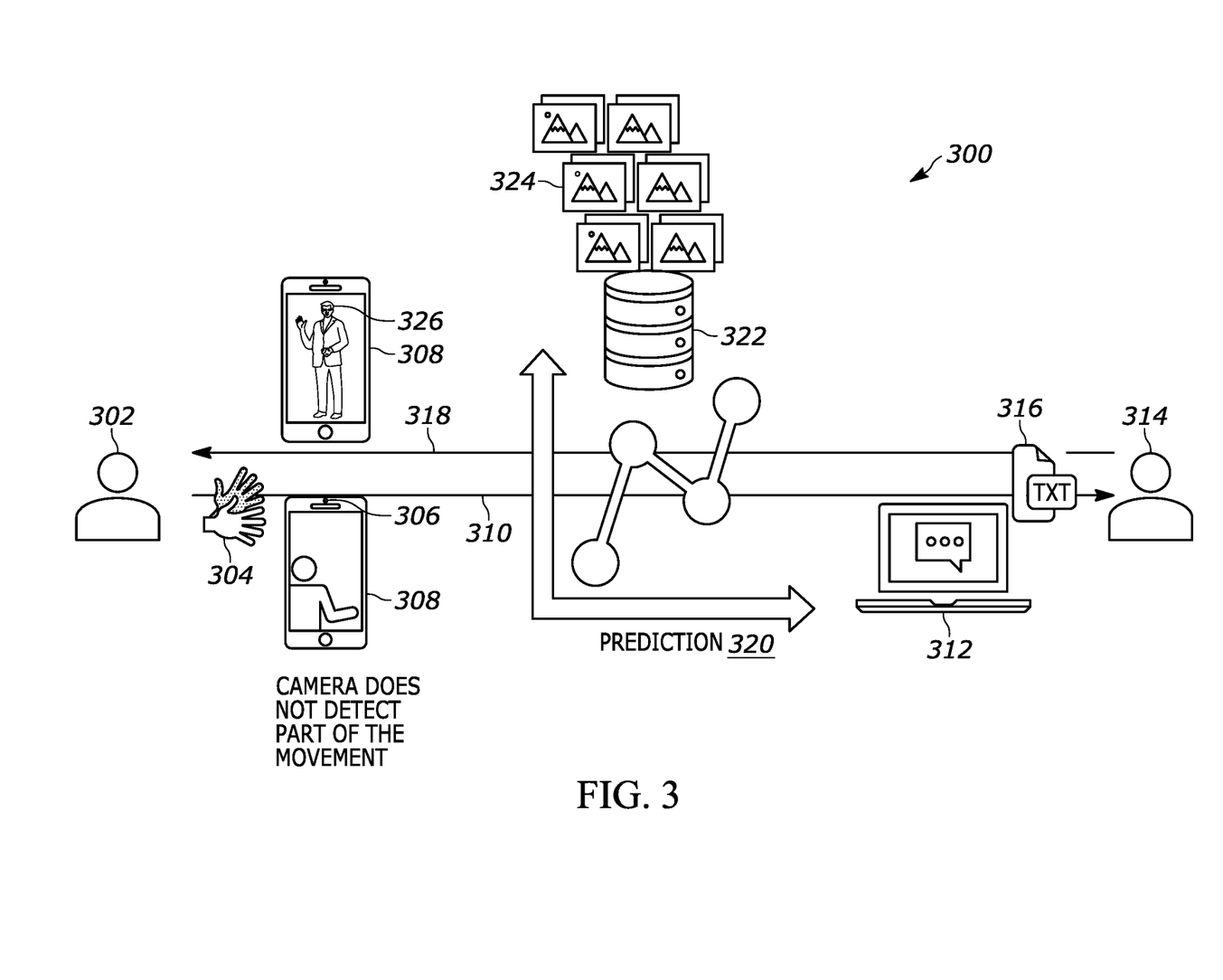
FIG. 3 shows an example schematic diagram for using context to resolve an ambiguous sign language gesture at least partially missed by a device's camera consistent with present principles.

Referring now to FIG. 3, it shows a schematic diagram 300 for using context to resolve ambiguous sign language missed by a device's camera consistent with present principles. As shown, video of a person 302 performing sign language 304 is generated by a front-facing camera 306 on a smartphone 308 being used by the person 302 to participate in a video conference. However, also note that present principles may apply in other technical settings as well, such as for translating video of sign language into text for use by a digital assistant to execute commands indicated by the sign language video, presenting closed captioning corresponding to video of sign language, controlling a video game character using video of commands made in sign language, and translating video of sign language into text for other uses by a CPU or other processor within a consumer electronics device.

In any case, as shown in FIG. 3 and assuming the person 302 is performing the sign language 304 to participate in a video conference, audio video (AV) data 310 may be transmitted from the smartphone 308 to another device 312 of another person 314 for presentation at the other device 312 (e.g., transmitted through a server or directly to the other device 312). So, for example, audio and video of the person 302 may be presented as a real-time AV feed at the device 312. Additionally, text 316 derived from the sign language 304 may be superimposed on the video stream as presented on the display of the device 312 (e.g., presented as closed captioning text or subtitles).

Also during the video conference, AV and other data 318 for the person 314 may be transmitted to the smartphone 308 for presentation at the smartphone 308, including audio picked up by a microphone on the device 312 and video generated by a camera on the device 312. For example, the data 318 may include audio of the person 314 speaking as part of the video conference and video of the person's face while speaking.

The data 318 may also include data beyond the audio and video of the person 314, such as an additional video stream of a three-dimensional (3D) puppet 326 or other virtual character real-time gesturing in sign language words that were spoken or typed by the person 314 as part of the video conference so that if the person 302 were deaf or had another disability, the person 302 could view the puppet 326 as presented on the display of the device 308 to understand in sign language the words the person 314 was conveying audibly or through writing. The sign language used by the puppet 326 may be American sign language, for example.

Now referring back to the text 316 derived from the sign language 304, note the sign language conversion to text 316 may be performed using an artificial intelligence-based prediction model 320. The prediction model 320 may have access to a local or remotely-located storage device housing a database 322 of respective reference image frames 324 each labeled with respective text for a respective word corresponding to a respective sign language gesture partially or fully shown in the respective reference image frame. The model 320 may then receive, as input, video from the device 308 partially showing the person 302 performing the sign language 304 and compare the partially-shown gesture made by the person 302 to gestures in the reference images from the database 322 to attempt to match the partially-shown gesture to gestures in one or more reference images in the database 322 to at least within a threshold level of confidence. In so doing, one or more candidate text words may be identified that are respectively associated in the database 322 with the reference images that were matched to the threshold level of confidence. One or more feature detection algorithms used in computer vision and/or image processing may be executed on the video of the person 302 to return feature points for comparison to feature points in the reference images for determining a match, for example.

Also, note that the threshold level of confidence used for determining a match between a gesture partially shown in the video of the person 302 and gestures shown in respective reference images (to thus return plural respective candidate text words) may be lower than another threshold level of confidence that might be used to more-confidently determine a single match between a gesture fully-shown in the video and a gesture in a reference image (to thus return a single text word as corresponding to the gesture). For example, the threshold confidence level for matching a partially-shown gesture may be fifteen percent, while the different threshold confidence level for matching a fully-shown gesture may be thirty percent or fifty percent.

Then, for sign language gestures only partially shown in the video, or even for gestures fully shown but for increased device confidence and accuracy, the model 320 may use context provided by surrounding words corresponding to other gestures made by the person 302 in the course of performing the sign language as part of the video conference. For example, both words corresponding to gestures made temporally before the ambiguous gesture and words corresponding to other gestures made temporally after the ambiguous gesture may be used to provide context for the model 320 to select an intended word from among the plural candidate words that have been identified as possibly corresponding to the ambiguous gesture (that is only partially gestured in view of the camera or that may not be gestured at all in view of the camera). The word selected as being intended by the person 302 may then be output by the prediction model 320 for use by the device as disclosed herein (e.g., to present text subtitles corresponding to the sign language 304).

Figure 4:
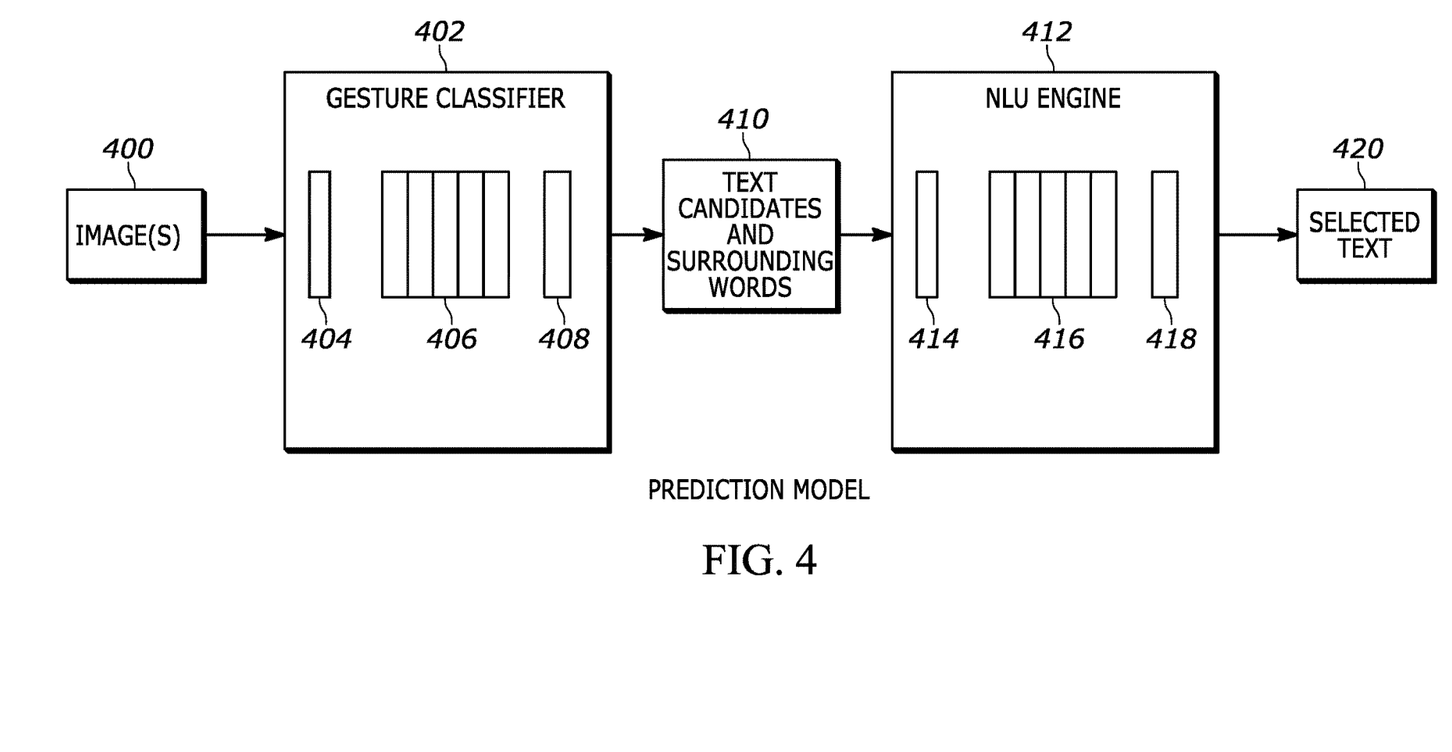
FIG. 4 shows example artificial intelligence (AI) architecture that may be used for a prediction model consistent with present principles.

Referring now to FIG. 4, it shows example artificial intelligence (AI) architecture that may be used for the prediction model 320 consistent with present principles. As shown, images 400 such as from the video of the person 302 described above may be provided as input to a gesture classifier 402. The gesture classifier 402 may be established by one or more artificial neural networks (ANNs), such as one or more recurrent neural networks (RNNs) and/or one or more convolutional neural networks (CNNs) for example.

Each ANN that is used as part of the gesture classifier 402 may include an input layer 404 with one or more nodes, one or more hidden layers 406 each with their own respective one or more nodes, and an output layer 408 also with one or more nodes. Example layers that may be used consistent with present principles, such as for the hidden layers 406, include batch normalization layers, Softmax layers, ReLU layers, gated recurrent units (GRUs), and long short-term memory (LSTM) layers. Some or all of the hidden layers 406 may be fully-connected, for example.

The layers for the classifier 402 may have been trained using labeled images from the database 322, supervised or unsupervised learning techniques, backpropagation techniques, and/or other machine learning methods to classify sample hand gestures partially and/or fully shown in sample input images as corresponding to one or more text words in one or more written languages (e.g., English, Portuguese, etc.). For example, hand gestures for frequently-used words like "the", "and", "you", "that", "with", etc. as only partially-shown in sample image frames may be used as input during training to render respective outputs. A system administrator or other person may then supervise to indicate whether the outputs are correct, and if the outputs were incorrect then backpropagation techniques may be used to adjust the weights of various nodes within the classifier 402 to make better inferences in the future. Also, note that in addition to or in lieu of using frequently-used words, sample image frames corresponding to various respective words may be randomly selected for use during training.

Then, after training and using the images 400 as input, the classifier 402 may output one or more candidate text words 410 that the classifier 402 has determined as potentially corresponding to a sign language gesture only partially shown in the image(s) 400 (e.g., the hand not being fully shown in any of the images 400 while making the gesture). In some examples, the classifier 402 may only output a threshold number of candidate text words, such as the top three candidate text words in which the classifier 402 has the first, second, and third-highest degrees of confidence in corresponding to the gesture itself. So, for example, if the threshold number were three and the classifier 402 actually identified five candidate text words for the gesture, only the top three candidate text words in which the classifier 402 has the three highest degrees of confidence may be provided as the output 410.

Or as another example, a threshold level of confidence may be used such that all candidate text words in which the classifier 402 has at least the threshold level of confidence may be selected to be included in the output 410. Other identified candidate text words that do not meet the threshold level of confidence may then be discarded. Both the threshold number and threshold level of confidence may be employed in various embodiments in order to reduce processing time by the natural language understanding (NLU) engine 412 that will be described shortly, to increase accuracy in the NLU engine 412 ultimately selecting a word from among the candidates, and/or to reduce battery/power consumption by the NLU engine 412.

Furthermore, in some example implementations to further reduce processing time, improve accuracy, and/or reduce power consumption, both the threshold number and threshold level of confidence may be used in combination. This may be done so that, for example, the candidate text words with the highest levels of confidence (which are all still over the threshold level of confidence) may be included in the output 410, but still no more than the threshold number of candidate words may be included in the output 410. So if the threshold number were three but only two candidate text words met the threshold level of confidence, only those two text words would be included in the output 410. But if the threshold number were still three but six candidate text words met the threshold level of confidence, only the top three determined with the highest-levels of confidence would be selected for the output 410.

Also, in addition to candidate text words for an ambiguous gesture, note that the output 410 in some examples may further include one or more other text words corresponding to different gestures identified from the video that the person might have gestured before and after the ambiguous gesture. Those different gestures may be referred to herein as surrounding gestures and the corresponding words for them may be referred to as surrounding words.

As also shown in FIG. 4, the output 410 of the candidate text words and one or more surrounding words may then become input 410 to the NLU engine 412. The engine 412 may also include one or more ANNs, including one or more RNNs, CNNs, and/or one or more hierarchical attention networks (HANs) for example. Each ANN that is used as part of the NLU engine 412 may include an input layer 414 with one or more nodes, one or more hidden layers 416 each with their own respective one or more nodes, and an output layer 418 also with one or more nodes. Example layers that may be used consistent with present principles, such as for the hidden layers 416, include batch normalization layers, Softmax layers, ReLU layers, gated recurrent units (GRUs), and long short-term memory (LSTM) layers. Some or all of the hidden layers 416 may be fully-connected, for example.

The layers for the engine 412 may have been trained using supervised or unsupervised learning, backpropagation techniques, and/or other machine learning techniques to use context provided by surrounding words to make a logical inference about which one of a sample set of candidate text words was most-likely to be intended in light of the surrounding words. This may be done based on one of the sample candidate text words conforming to or fitting the context with a higher level of confidence than the other sample candidate text words.

Then after training and using the input 410 as input, a most-likely candidate text word that was intended by the person 302 may be selected by the engine 412 using a logical inference based on the given context identified from surrounding words. The selected candidate text word may then be included in output 420. In some examples, the selected candidate text word may be included in a text string establishing the output 420. The text string may also include additional text words placed before and after the selected candidate text word, where the additional text words were identified as corresponding to sign language gestures gestured by the person respectively before and after the ambiguous gesture corresponding to the selected candidate text word.

Figure 5:
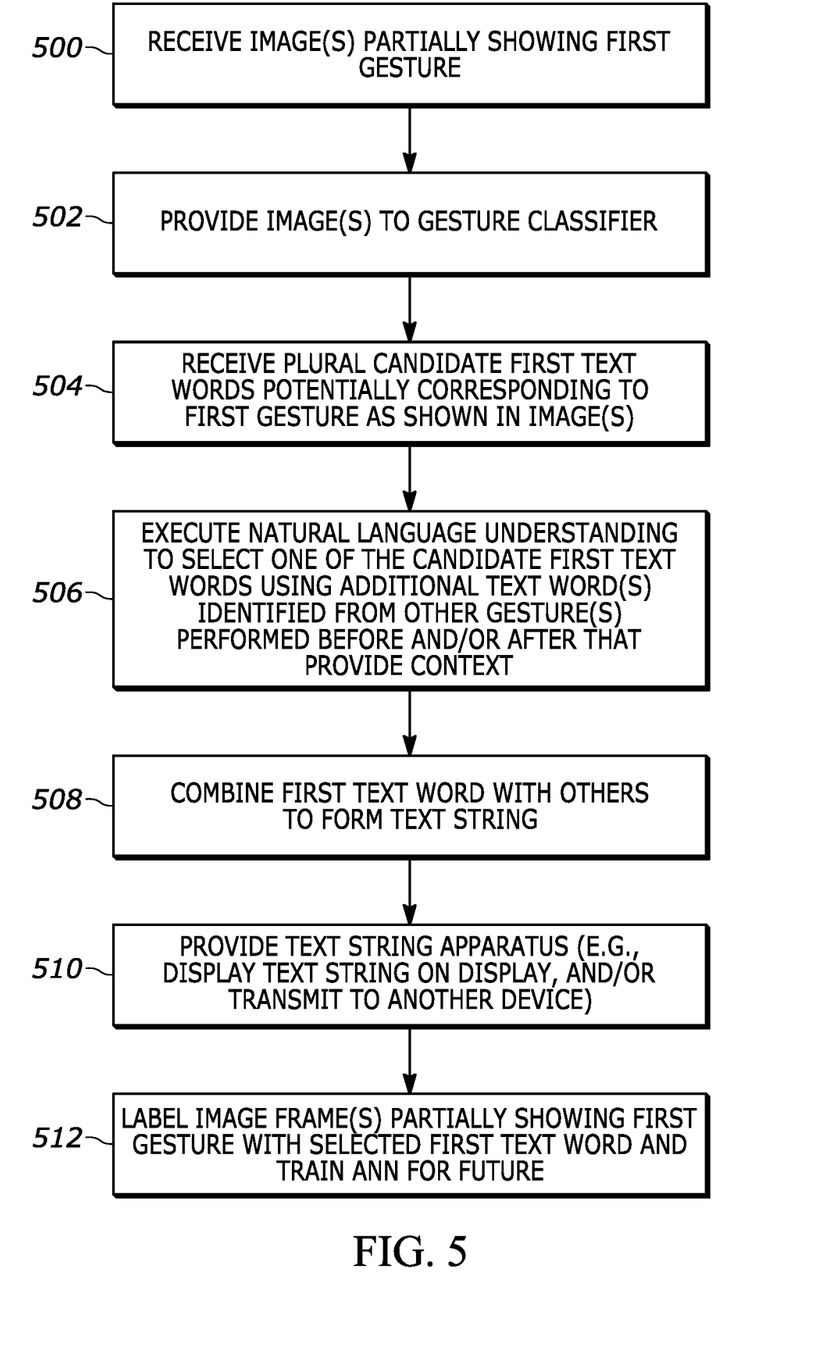
FIG. 5 shows a flow chart of an example algorithm for execution consistent with present principles.

Continuing the detailed description in reference to FIG. 5, it shows example overall logic that may be executed by a device such as the system 100 or another device consistent with present principles. For example, the logic of FIG. 5 may be executed by an end-user's device that streams video from its camera of the end-user performing sign language, by a server that receives the video stream, or by another end-user device that receives the video stream.

Beginning at block 500, the device may receive images partially showing a first gesture (where possibly no image frames of the video fully show the person's hand as the gesture is made). Again depending on which device might be executing the logic of FIG. 5, the images may be received from a camera on the device itself or a camera on another device streaming the video to the device executing the logic of FIG. 5.

From block 500 the logic may then proceed to block 502 where the device may provide the received images to a gesture classifier such as the classifier 402 described above. The gesture classifier may be executing locally at the device executing the logic of FIG. 5 or even remotely at another device (e.g., a server).

From block 502 the logic may proceed to block 504. At block 504 the device may receive plural candidate first text words from the classifier that potentially correspond to the first gesture as partially shown in the images received at block 500. From block 504 the logic may then proceed to block 506.

At block 506 the device may execute natural language understanding to select one of the candidate first text words based on context identified using additional, surrounding text words identified from other gestures performed before and/or after the first gesture that may provide context to the first gesture. For example, at block 506 the engine 412 may be executed locally and the candidate first text words may be provided as input. Or if the engine 412 executes at a different device (e.g., a server), then the candidate first text words may be transmitted to the other device for input into the engine 412 as executing at the other device.

After block 506 the logic may proceed to block 508 where the device may combine the selected first text word output by the natural language understanding with surrounding text word(s) for other gestures to establish a text string. The text string may order the words in the same order or sequence as their respective gestures were gestured as part of sign language performed by the person.

From block 508 the logic may then proceed to block 510. At block 510 the device may provide the text string to an apparatus. The apparatus may be another hardware component on the same device executing the logic of FIG. 5, such as another processor than the one executing the logic of FIG. 5 or a touch-enabled display of the device. Additionally or alternatively, the apparatus may be another device, such as a server or other end-user device (e.g., smartphone) to which the text string may be provided for further processing or to execute a function at the other device. One example function that might be executed at the other device might include presenting the text string at the other device audibly via speakers (e.g., using text to speech) or visually via a display on the other device (e.g., as closed captioning).

From block 510, if desired the logic may then proceed to block 512. At block 512 the device may select and label one or more image frames received at block 500 with the selected first text word determined at block 506. This labeled data may then be used to further train one or more ANNs used by the gesture classifier employed at block 502 for future use.

Figure 6:
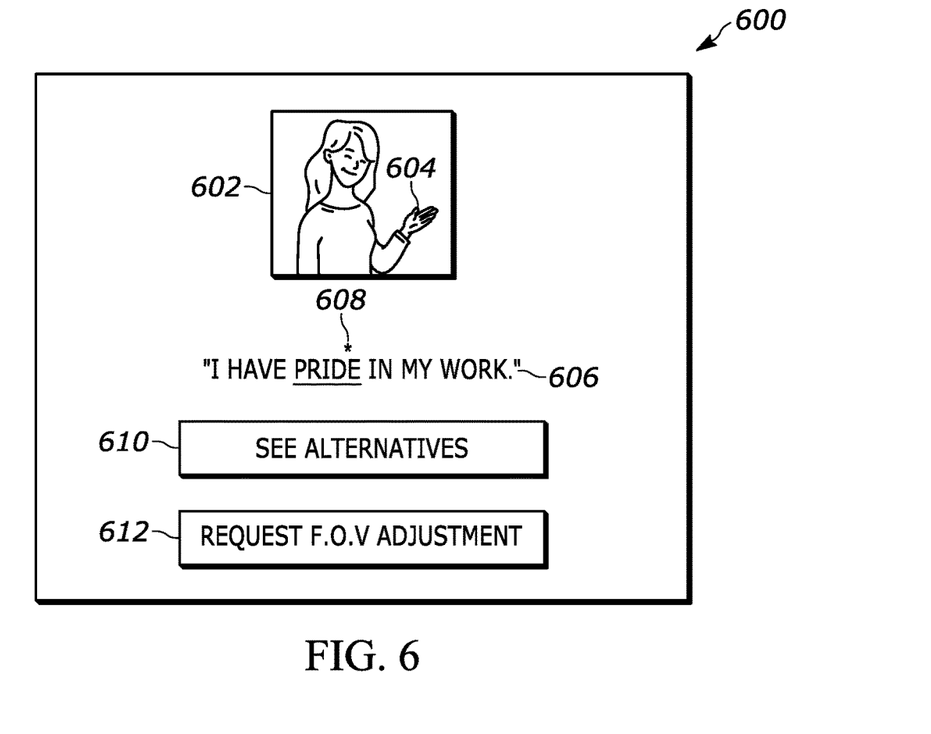
FIG. 6 shows an example graphical user interface (GUI) on which an example text string may be presented that includes a word determined from an ambiguous sign language gesture.

Referring now to FIG. 6, it shows an example graphical user interface (GUI) 600 that may be presented on the display of a device operating consistent with present principles. For example, the GUI 600 may be presented on a display accessible to a device executing the logic of FIG. 5 or the GUI 600 may be presented on a display of another device that receives a text string from a device that executed the logic of FIG. 5.

As shown in FIG. 6, in this example the GUI 600 is for video conferencing, with a remotely-located person being shown in a real-time video stream 602. It may be appreciated that the remotely-located person is gesturing sign language gestures with his or her hand 604. In this case, only part of the gesture is shown and it is to be understood that another part of the same gesture for a given word was performed out of the field of view of the camera generating the stream 602. As such, an ambiguity has arisen as to whether the person's gesture is meant to convey the word "pride" or the word "age". Based on execution of a prediction model such as the one described above and/or execution of the logic of FIG. 5, for example, the word "pride" has been selected from these two candidate words and has been presented on the GUI 600 as part of a text string 606. As also shown in FIG. 6, the text string 606 may also indicate surrounding words that were gesture before and after the "pride" gesture and that provide context for the word "pride" being the intended word (e.g., since "I have 'age' in my work" is determined by the model to make less sense contextually than "I have 'pride' in my work".).

Note that to visually distinguish the word "pride" from other words in the string 606 that were fully shown in the stream 602 and/or initially had no ambiguity to resolve with the model, a non-text icon 608 such as an asterisk may be presented above the word "pride" in the text string. The word "pride" may also be underlined as shown to further convey that the corresponding gesture was initially ambiguous.

Additionally, momentarily assume that the word "pride" was incorrectly selected for inclusion in the text string 606 as determined by a local end-user himself or herself. To change the word, the user may direct touch or cursor input to the selector 610 shown in FIG. 6. The selector 610 may be selectable to command the device to present a pop-up GUI (e.g., overlaid on the GUI 600) that may list the other candidate text words, e.g., that were output by the gesture classifier. Each word on the list may then be selectable via touch or cursor input to command the device to replace the word "pride" as shown in the text string 606 on the GUI 600 with the other candidate text word selected from the pop-up GUI. Additionally, in some examples selection of the alternate candidate text word from the pop-up GUI may trigger additional training of the gesture classifier using one or more image frames of the associated gesture from the stream 604 and using the candidate word selected from the pop-up GUI as a label for the gesture classifier to make more accurate predictions in the future.

Still describing FIG. 6, if desired the GUI 600 may further include a selector 612. The selector 612 may be selected via touch or cursor input in order to command the device to transmit a message to the person on the other end of the video conference. The message may be presented on the display of the other person's device and indicate in text and/or via a 3D puppet (like the puppet 326) that the other user might want to adjust his or her distance or position with respect to their device's camera, and/or adjust the field of view of the camera itself (e.g., "zoom out further"), to more-fully show gestures that might be partially performed outside of the current field of view of the camera.

Figure 7:
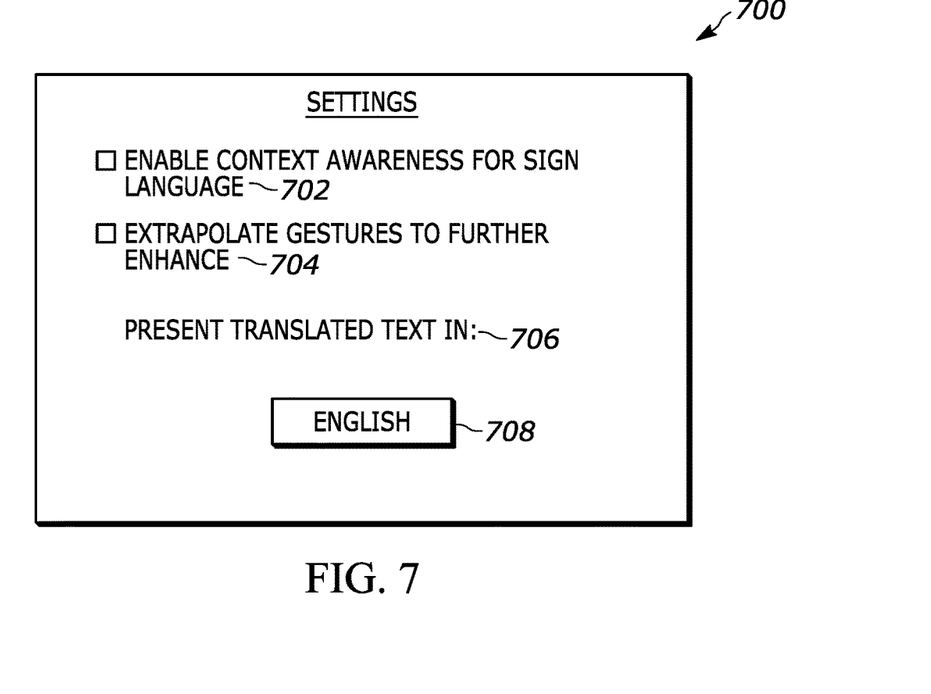
FIG. 7 shows an example GUI that may be presented on a display for configuring one or more settings of a device to operate consistent with present principles.

Continuing now in reference to FIG. 7, it shows another example GUI 700 that may be presented on the display of a device configured to undertake present principles. For example, the GUI 700 may be presented at an end-user's device to configure settings of the device, or on a display of a server to configure settings of the server.

As shown in FIG. 7, the GUI 700 may include a first setting 702 that may be selectable by directing touch or cursor input to the adjacent check box in order to set or enable the device to undertake present principles. For example, selection of the setting 702 may set or configure the device to, in the future, execute the functions described above in reference to FIGS. 3, 4, and 6 and/or to execute the logic of FIG. 5.

The GUI 700 may also include a second setting 704 that may be selectable by directing touch or cursor input to the adjacent check box in order to set or enable the device to extrapolate additional portions of an image that only partially shows a given sign language gesture to further enhance gesture classification by a gesture classifier configured consistent with present principles. Thus, selection of the setting 704 may set or configure the gesture classifier or other AI component to synthetically generate additional portions of the image beyond the actual borders of the actual image to synthetically expand the field of view shown in the image. This may be done by inferring additional image values from trends (e.g., feature points and features) shown in the known portions of the actual image to enlarge the borders of the image with synthetic portions above, below, left and right of the actual image to in effect show additional portions of the same features than are shown in the actual image. So, for example, a feature line of one of the person's fingers may be extended beyond the border of the actual image itself to form part of the enhanced image since the finger might have only been partially shown in the actual image. This enhanced image may then be provided as input to the gesture classifier for the gesture classifier to identify one or more candidate words based on the enhanced image rather than actual image for further accuracy.

As also shown in FIG. 7, the GUI 700 may also include a setting 706 for a user to select a language for which text words corresponding to sign language gestures are to be presented or placed in a text string. For example, Libras sign language or Chinese sign language may have been physically gestured by one person but only partially shown in an image frame, a selected candidate text word in written Portuguese or Chinese (respectively) may then be selected as correlated to the gesture, and the selected candidate text word may then be translated into another written language selected via the setting 706 in order to present the translated word and surrounding text words in a text string in the selected written language (English in this case) rather than in the other written language (Portuguese or Chinese). For completeness, also note that other sign languages and written languages may be used in addition to the ones discussed herein. Further note that the translation itself of the text string from one written language to another may occur using an online translation tool or other language translator, for example.

In any case, in the current example a selector 708 may be used to select the written language into which the text string is to be translated. For example, the selector 708 may be selectable to present a drop-down list from which one of various written languages may be selected and also indicated on the face of the selector 708 as the selected written language.

It may now be appreciated that present principles provide for an improved computer-based user interface that may increase the functionality, accuracy, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
    at least one processor; and
    storage accessible to the at least one processor and comprising instructions executable by the at least one processor to:
    present, on a display, a settings graphical user interface (GUI), the settings GUI comprising plural settings, the settings GUI comprising a first setting that is selectable to configure the first device to classify ambiguous gestures using one or more images, the settings GUI comprising a second setting that is selectable to configure the first device to make inferences regarding ambiguous gestures using context;
    identify user selection of the first setting;
    identify user selection of the second setting;
    responsive to identification of user selection of the first setting, configure the first device to classify ambiguous gestures using one or more images;
    responsive to identification of user selection of the second setting, configure the first device to make inferences regarding ambiguous gestures using context;
    receive one or more first images from a camera, the one or more first images indicating a first gesture that is ambiguous and that is being made by a person using a hand-based sign language, at least part of the ambiguous first gesture extending out of at least one respective image frame of the one or more first images;
    classify the ambiguous first gesture using the one or more first images and a sign language gesture classifier established at least in part by an artificial neural network;
    receive, from the sign language gesture classifier, plural candidate first text words for the ambiguous first gesture;
    use context related to a second text word correlated to a second gesture different from the ambiguous first gesture to infer one of the candidate first text words as an intended word for the ambiguous first gesture;
    combine the second text word with the intended word to establish a text string;
    provide the text string to an application executing at one or more of: the first device, a second device; and
    use the application to execute an operation based on the text string.

2. The first device of claim 1, wherein at least part of the ambiguous first gesture extends out of each respective image frame of the one or more first images.

3. The first device of claim 1, wherein natural language understanding is executed to infer one of the candidate first text words as the intended word using the second text word.

4. The first device of claim 1, wherein the sign language gesture classifier is configured for receiving as input images of respective gestures and providing as output one or more respective text words corresponding to respective gestures from the input.

5. The first device of claim 4, wherein the sign language gesture classifier uses a database of image frames corresponding to respective gestures to provide the output.

6. The first device of claim 1, wherein the instructions are further executable to:
    use at least the second text word and a third text word correlated to a third gesture different from the first and second gestures to infer one of the candidate first text words as the intended word for the ambiguous first gesture, wherein the second gesture as indicated in one or more second images from the camera was gestured before the ambiguous first gesture and wherein the third gesture as indicated in one or more third images from the camera was gestured after the ambiguous first gesture; and
    combine the second and third text words with the intended word for the ambiguous first gesture to establish the text string, the text string comprising the second text word placed before the intended word and comprising the third text word placed after the intended word.

7. The first device of claim 1, further comprising the camera.

8. The first device of claim 1, wherein the instructions are further executable to:
    provide the text string to the application executing at the first device.

9. The first device of claim 1, wherein the instructions are further executable to:
    provide the text string to the application executing at the second device.

10. The first device of claim 1, further comprising the display.

11. The first device of claim 1, wherein the first setting is different from the second setting, the first and second settings being listed vertically on the settings GUI.

12. A method, comprising:
    presenting, on a display accessible to a first device, a settings graphical user interface (GUI), the settings GUI comprising plural settings, the settings GUI comprising a first setting that is selectable to configure the first device to classify ambiguous gestures using one or more images, the settings GUI comprising a second setting that is selectable to configure the first device to make inferences regarding ambiguous gestures using context;
    identifying user selection of the first setting;
    identifying user selection of the second setting;
    responsive to identifying user selection of the first setting, configuring the first device to classify ambiguous gestures using one or more images;

responsive to identifying user selection of the second setting, configuring the first device to make inferences regarding ambiguous gestures using context;

providing, at the first device, at least a first image showing a first gesture into a gesture classifier to receive, as inferred output from the gesture classifier, a first text word corresponding to the first gesture;

providing, at the first device, at least a second image partially but not fully showing a second gesture that is ambiguous into the gesture classifier to receive, as inferred output from the gesture classifier, a second text word corresponding to the second gesture, the second gesture being different from the first gesture, the second text word being different from the first text word;

providing, to an application, a text string indicating the first text word and the second text word; and using the application to execute an operation based on the text string.

13. The method of claim 12, wherein the gesture classifier extrapolates additional portions of the second gesture extending out of the second image partially but not fully showing the second gesture, and wherein the gesture classifier uses the extrapolation to output the second text word.

14. The method of claim 12, wherein the first setting is different from the second setting, the first and second settings being listed vertically on the settings GUI.

15. At least one computer readable storage medium (CRSM) that is not a transitory signal, the computer readable storage medium comprising instructions executable by at least one processor to:

present, on a display of a first device, a settings graphical user interface (GUI), the settings GUI comprising plural settings, the settings GUI comprising a first setting that is selectable to configure the first device to classify ambiguous gestures using one or more images, the settings GUI comprising a second setting that is selectable to configure the first device to make inferences regarding ambiguous gestures using context;

identify user selection of the first setting;

identify user selection of the second setting;

responsive to identification of user selection of the first setting, configure the first device to classify ambiguous gestures using one or more images;

responsive to identification of user selection of the second setting, configure the first device to make inferences regarding ambiguous gestures using context;

receive one or more first images from a camera, the one or more first images indicating a first gesture that is ambiguous and that is being made by a person using a hand-based sign language, at least part of the ambiguous first gesture extending out of at least one respective image frame of the one or more first images;

classify the ambiguous first gesture using the one or more first images and a sign language gesture classifier established at least in part by an artificial neural network;

receive, from the sign language gesture classifier, plural candidate first text words for the ambiguous first gesture;

use context related to a second text word correlated to a second gesture different from the ambiguous first gesture to infer one of the candidate first text words as an intended word for the ambiguous first gesture;

combine the second text word with the intended word to establish a text string;

provide the text string to an application executing at one or more of: the first device, a second device; and use the application to execute an operation based on the text string.

16. The at least one CRSM of claim 15, wherein at least part of the ambiguous first gesture extends out of each respective image frame of the one or more first images.

17. The at least one CRSM of claim 15, wherein natural language understanding is executed to infer one of the candidate first text words as the intended word using the second text word.

18. The at least one CRSM of claim 15, wherein the sign language gesture classifier is configured for receiving as input images of respective gestures and providing as output one or more respective text words corresponding to respective gestures from the input.

19. The at least one CRSM of claim 18, wherein the sign language gesture classifier uses a database of image frames corresponding to respective gestures to provide the output.

20. The at least one CRSM of claim 15, wherein the first setting is different from the second setting, the first and second settings being listed vertically on the settings GUI.

* * * * *